United States Patent
Sen et al.

(10) Patent No.: US 10,839,160 B2
(45) Date of Patent: Nov. 17, 2020

(54) ONTOLOGY-BASED AUTOMATIC BOOTSTRAPPING OF STATE-BASED DIALOG SYSTEMS

(71) Applicant: International Business Machines Corporation, Armonk, NY (US)

(72) Inventors: Jaydeep Sen, Bangalore (IN); Parag Jain, Bangalore (IN); Diptikalyan Saha, Bangalore (IN); Ashish Mittal, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 15/875,303

(22) Filed: Jan. 19, 2018

(65) Prior Publication Data

US 2019/0228068 A1    Jul. 25, 2019

(51) Int. Cl.
*G06F 40/30* (2020.01)
*G06F 16/242* (2019.01)
(Continued)

(52) U.S. Cl.
CPC ............ *G06F 40/30* (2020.01); *G06F 16/242* (2019.01); *G06F 16/9024* (2019.01); *G06F 40/295* (2020.01)

(58) Field of Classification Search
CPC .. G06F 17/278; G06F 17/2785; G06F 16/242; G06F 16/9024; G06F 17/30389;
(Continued)

(56) References Cited

U.S. PATENT DOCUMENTS

| 7,421,393 B1* | 9/2008 | Di Fabbrizio ......... G10L 15/28 379/88.04 |
| 8,942,986 B2 | 1/2015 | Cheyer et al. |

(Continued)

OTHER PUBLICATIONS

Saha et al., ATHENA: An Ontology-Driven System for Natural Language Querying over Relational Data Stores, Proceedings of the VLDB Endowment, vol. 9, No. 12, 2016.

(Continued)

*Primary Examiner* — Angela A Armstrong
(74) *Attorney, Agent, or Firm* — Ryan, Mason & Lewis, LLP

(57) ABSTRACT

Methods, systems, and computer program products for bootstrapping of state-based dialog systems are provided herein. A computer-implemented method includes determining parameters for state automata by partitioning an ontology graph into sub-graphs and a knowledge graph into sub-graphs, wherein the ontology graph and the knowledge graph are based on a user question and domain knowledge pertaining to the user question; generating a structured query for each of the sub-graphs; determining intentions of a dialog pertaining to the at least one user question by translating each of the generated structured queries to a respective natural language query; creating one or more dialog states for each of the determined dialog intentions; creating one or more connecting dialog states between pairs of the created dialog states; and generating an automata dialog framework associated with the user question based on the created dialog states and the created connecting dialog states.

18 Claims, 11 Drawing Sheets

(51) Int. Cl.
*G06F 16/901* (2019.01)
*G06F 40/295* (2020.01)

(58) Field of Classification Search
CPC ... G06F 17/30958; G06F 40/295; G06F 40/30
See application file for complete search history.

(56) References Cited

U.S. PATENT DOCUMENTS

| | | |
|---|---|---|
| 9,473,637 B1 | 10/2016 | Venkataphathy et al. |
| 2014/0379323 A1 | 12/2014 | Anastasakos et al. |
| 2016/0019290 A1* | 1/2016 | Ratnaparkhi ....... G06F 16/9024 707/743 |
| 2016/0322050 A1 | 11/2016 | Wang et al. |
| 2017/0163584 A1* | 6/2017 | Meng ...................... H04L 51/18 |
| 2018/0232443 A1* | 8/2018 | Delgo ................... G06F 17/278 |
| 2019/0188332 A1* | 6/2019 | Ingvaldsen ......... G06F 17/2785 |

OTHER PUBLICATIONS

Kumaravelan et al., A Learning Automata based Solution for Optimizing Dialogue Strategy in Spoken Dialogue System, International Journal of Computer Applications (0975-8887) vol. 58—No. 9, Nov. 2012.
Wikipedia, Watson (computer), https://en.wikipedia.org/w/index.php?title=Watson_(computer)&oldid=820132617, Jan. 13, 2018.
Wikipedia, Dialogflow, https://en.wikipedia.org/w/index.php?title=Dialogflow&oldid=820918548, Jan. 17, 2018.
Kopecek et al., Faculty of Informatics, Masaryk University, Modelling Dialogue Systems by Finite Automata, Mar. 2003.
Milward et al., Ontology-Based Dialogue Systems, 2003.

\* cited by examiner

302

```
"SELECT o.{{C1 P1}} FROM {{C1}} o"
"SELECT o.{{C1 P1}}, o.{{C1 P2}} FROM {{C1}} o"
"SELECT count (o.{{C1 P1}}) FROM {{C1}} o"
"SELECT min (o.{{C1 INTAGGR P1}}) FROM {{C1}} o"
"SELECT max (o.{{C1 INTAGGR P1}}) FROM {{C1}} o"
"SELECT o1.{{C1 P1}} FROM {{C1}} o1, {{C11}} o2 WHERE o1 -> {{PATH C1 C11 STR P1}} =
 {{C11 STR P1 VAL}}"
"SELECT o2.{{C11 P1}} FROM {{C1}} o1, {{C11}} o2 WHERE o1 -> {{PATH C1 C11 INT P1}} =
 {{C11 INT P1 VAL}}"
"SELECT o2.{{C11 P1}} FROM {{C1}} o1, {{C11}} o2 WHERE o1 -> {{PATH C1 C11 STR P1}} =
 {{C11 STR P1 VAL}}"
"SELECT o2.{{C11 P1}} o3.{{C12 P1}} FROM {{C1}} o1, {{C11}} o2, {{C12}} o3 WHERE o1 -> {{PATH C1 C11}} = o2
 AND o1 -> {{PATH C1 C12}} = o3"
```

FIG. 3

ONTOLOGY-BASED AUTOMATIC BOOTSTRAPPING OF STATE-BASED DIALOG SYSTEMS

FIELD

The present application generally relates to information technology, and, more particularly, to dialog framework technology.

BACKGROUND

Existing dialog frameworks are typically based on a generic framework which has a state-based automata model at its core. Any end-application trying to use such a dialog framework would need to custom-fill the state automata parameters to instantiate a dialog framework suitable for that application. However, custom-filling the automata parameters requires manual intervention and commonly creates a major bottleneck in instantiating a dialog framework for an end-application.

SUMMARY

In one embodiment of the present invention, techniques for ontology-based automatic bootstrapping of state-based dialog systems are provided. An exemplary computer-implemented method can include determining one or more parameters for state automata for use by one or more automated conversation exchange programs by partitioning each of (i) at least one ontology graph into multiple sub-graphs and (ii) at least one knowledge graph into multiple sub-graphs, wherein each of (i) the at least one ontology graph and (ii) the at least one knowledge graph is based on both at least one user question and domain knowledge pertaining to the at least one user question, and wherein each state in the state automata represents a structured action comprising at least one of a query and a command. The method can also include generating a structured query for each of the multiple sub-graphs, and determining one or more intentions of a dialog pertaining to the at least one user question by translating each of the generated structured queries to a respective natural language query. Additionally, the method can include creating one or more dialog states for each of the determined dialog intentions, creating one or more connecting dialog states between pairs of the created dialog states, and generating an automata dialog framework associated with the at least one user question based on (i) the created dialog states and (ii) the created connecting dialog states.

In another embodiment of the invention, an exemplary computer-implemented method can include identifying, based on an analysis of an ontology graph and a knowledge graph pertaining to a particular end application, multiple states for a state automata dialog framework as valid interpretation graphs over the ontology graph, wherein each of the multiple states represents a structured action; determining one or more transition rules between related ones of the identified states, wherein each of the transition rules captures how the state automata dialog framework evolves from a first state to a second state; assigning natural language passages to the one or more transition rules; and designing the state automata dialog framework for the particular end application based on (i) the multiple states, (ii) the one or more transition rules, and (iii) the assigned natural language passages.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating creating query classes, according to an exemplary embodiment of the invention;

DETAILED DESCRIPTION

Figure 1:
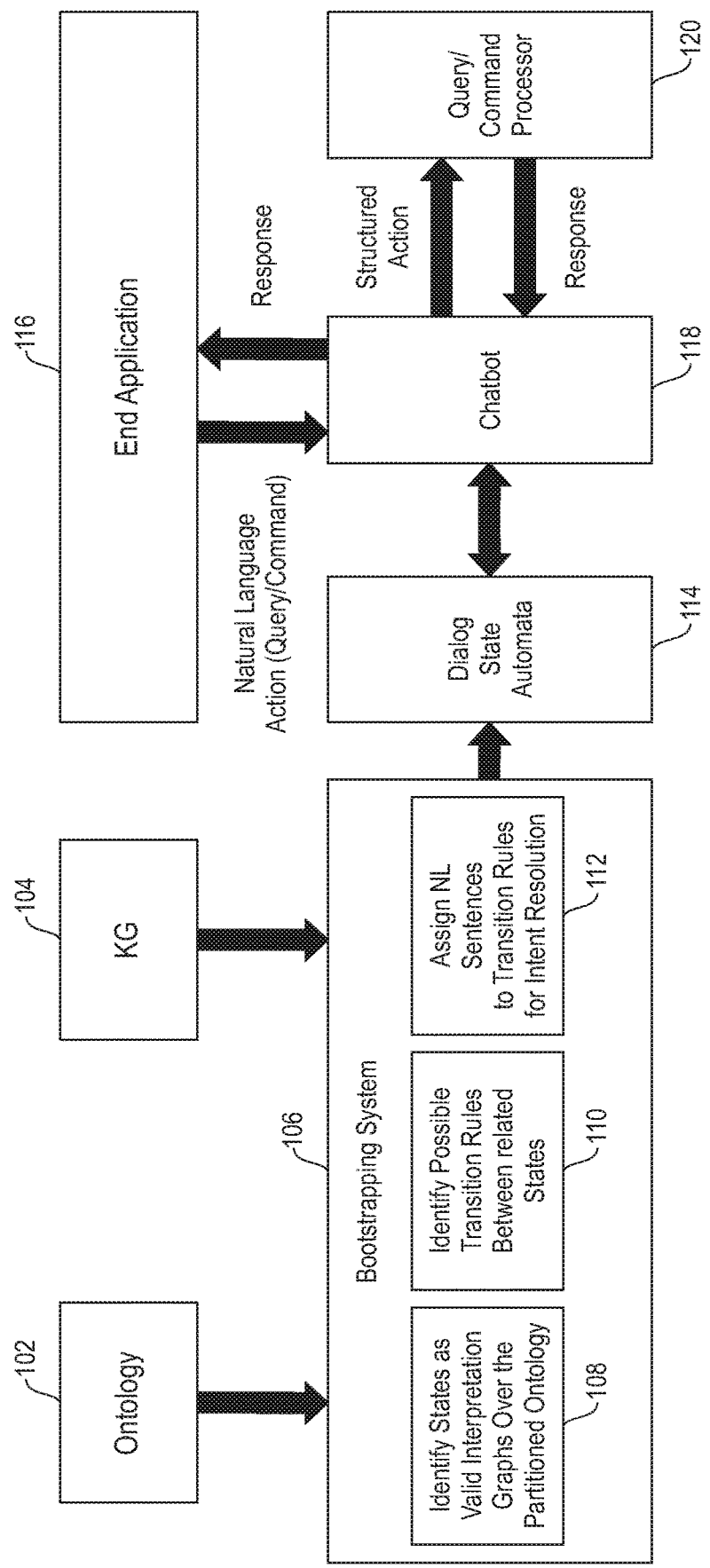
FIG. 1 is a diagram illustrating system architecture, according to an exemplary embodiment of the invention.

As described herein, an embodiment of the present invention includes ontology-based automatic bootstrapping of state-based dialog systems. At least one embodiment of the invention can include utilizing domain knowledge from an ontology and one or more knowledge graphs to design a complete state automata. In such a state automata, each state can stand for a structured action (such as a query or a command) over the elements in the ontology. Additionally, in such a state automata, a transition between two states captures how the dialog flow evolves from action to action. Further, such a state automata can enable chatbots (that is, automated conversation exchange programs) to understand the natural language action (the query or command, for example) and to take appropriate action by translating the natural language action into a structured action.

Accordingly, one or more embodiments of the invention include automatically filling state automata parameter slots to design and instantiate a dialog framework for an end-application based on a relevant ontology of domain knowledge. Such an embodiment includes automatically creating an ontology and a knowledge graph based on analysis of a user question, the user's intention, and the domain knowledge pertaining to the user question. Additionally, such an embodiment can include extracting parameters for state automata by partitioning the ontology and knowledge graph into sub-graphs based on data collected from one or more external sources. In at least one embodiment of the invention, an ontology partitioning procedure can include implementing a functional partitioning of the ontology to identify how many relationships to traverse from a specific evidence set for a partially-typed query by considering the boundary between individual domain functionalities.

Further, such an embodiment can also include automatically mapping the ontology-based domain knowledge to the state automata parameters, and filling state parameters for redesigning and instantiating the automata dialog framework.

Bridging chatbot automata using ontology, as described herein, can include usage of the following terms and elements. Each interpretation graph in an ontology is referred to herein as a "state" in a chatbot automata. Thus, each state identifier (ID) uniquely identifies an interpretation graph in the ontology, and each transition edge between the interpretations is also a state to capture non-sequential utterances (NSUs) and/or co-references flowing between the interpretations. Also, an "input context" of a state can be represented as: (the previous state ID+filled-in parameter values), while an "output context" of a state can be represented as (the current state ID+filled-in parameter values).

Additionally, an "output action" can refer to the backend action identified by the interpretation graph of that state and ultimately executed. The backend action can be anything specific to the application. An "entity" can refer to ontology concepts, properties, etc., and "sample questions" can include natural language questions and/or non-sentential utterances that are generated and that can lead the automata to transit from one state to another. As also detailed herein, "parameters" can include required parameters and optional parameters. Required parameters can include, for example, for single concept states, the concept entity. Optional parameters can include, for example, a union of data properties of all of the concepts in the interpretation graph for a given state.

At least one embodiment of the invention can also include enumerating states and transition edges. Such an embodiment can include partitioning the ontology graph into multiple sub-graphs, $O=\{P_1, P_2, \ldots P_n\}$, wherein each subgraph $P_i$ captures a unique semantic relationship in the ontology. One or more embodiments of the invention can also include setting states: Set<States>S={}. In such an embodiment, for each partition $P_i$, all possible combinations of concepts ($C_i \in P_i$) in that partition are generated. For each concept combination $CC_i$ generated, such an embodiment can include determining all possible interpretation trees connecting the concept combination $CC_i$. For each tree $IT_{CCi}$ determined, such an embodiment can also include creating a state $SIT_{CCi}$ if the state creates a valid interpretation graph. Additionally, optional parameters of the state $SIT_{CCi}$ can be generated to equal U {data properties($C_i$)}, such that $C_i \in CC_i$. Accordingly, via such an embodiment, $S=S+SIT_{CCi}$.

One or more embodiments of the invention can also include determining transition edges. By way of example, within each partition, for each pair of states $SIT_{CCi}$, $SIT_{CCj} \in S$, if (ConceptsIn($SIT_{CCi}$) $\subset$ ConceptsIn($SIT_{CCj}$)), then add a transition edge as $SIT_{CCi} \rightarrow SIT_{CCj}$. By way of further example, across partitions, for each pair of states $SIT_{CCi}$, $SIT_{CCj} \in S$, if ($\exists$ Concept C such that C $\in$ $SIT_{CCi} \cap SIT_{CCj}$ OR C $\in$ $SIT_{CCi}$ and Parent(c) $\in$ $SIT_{CCj}$), then add a transition edge as $SIT_{CCi} \rightarrow SIT_{CCj}$.

Additionally, at least one embodiment of the invention can include implementing an algorithm for populating state internal details. By way of example, for each edge between a pair of states ($S_i$, $S_j$), such an embodiment can include adding output context to $S_i$ as context_out$_i$(that is, state IDS$_i$+filled-in parameter values), and adding to the input context of $S_j$ as context_in$_j$(that is, context_in$_j$ U (state ID $S_i$+filled in parameter values)). Also, for each state $S_i$, if $S_i$ is a single concept state, one or more embodiments of the invention can include adding "concept entity" as a required parameter; else, such an embodiment can include add "union of data properties of all of the concepts in the Interpretation Graph for that state" as an optional parameter.

At least one embodiment of the invention also includes implementing an algorithm for generating sample questions for chatbot state transitions. By way of example, generating questions for self-loop transitions in a state can include the following. For each state $S_i$, for all possible sets of parameters $P_i$ of $S_i$, random sample N parameters sets can be represented as $P_{is}$ (that is, random($P_i$, N)). For each parameter set p in $P_{is}$, $Q_i=Q_i$ U (Generate a sample question using p).

Further, one or more embodiments of the invention can include generating questions for transitions between states. For each transition between states ($S_i \rightarrow S_j$), and for all possible set parameters $P_{ij}$ which are part of $S_j$ but are not present in $S_i$, random sample N parameters sets can be represented as $P_{ijs}$ (that is, random($P_{ij}$, N)). For each parameter set p in $P_{ijs}$, $Q_{ij}=Q_{ij}$ U, a sample question can be generated using p.

At least one embodiment of the invention can also include identifying and/or generating a start state. In such an embodiment, the automata can start in the state corresponding to the interpretation graph of the first query submitted to the chatbot. Similarly, at least one embodiment of the invention can additionally include identifying and/or generating a stop state. In such an embodiment, the automata can have a single stop state, which is reachable from multiple states. For example, for a goal driven system, each possible goal state can reach the stop state after a certain duration of time passes with no further questions. Additionally, for a non-goal-driven system, each state in the automata can reach the stop state after processing certain inputs, such as "End of Conversation" phrases, and/or after a certain duration of time passes with no further questions. Further, a set of questions indicating that a goal state has been reached, or "End of Conversation" phrases have been processed, can be taken as input from the user who is developing the target end-application.

FIG. 1 is a diagram illustrating system architecture, according to an embodiment of the invention. By way of illustration, FIG. 1 depicts an ontology 102 and a knowledge graph (KG) 104, which are utilized by bootstrapping system 106 to carry out steps 108, 110, and 112. Specifically, step 108 includes identifying states as valid interpretation graphs over the partitioned ontology. One or more embodiments of the invention can additionally include partitioning the ontology 102. Also, step 110 includes identifying possible transition rules between related states, and step 112 includes assigning natural language (NL) sentences to transition rules for intent resolution.

As also depicted in FIG. 1, the output of bootstrapping system 106 (including, for example, the assigned NL sentences) can include a dialog state automata 114, from which a chatbot 118 is created. By way of example, one or more embodiments of the invention can include implementing a chatbot building framework to take a chatbot specification (such as, for example, a dialog state automata) and create a chatbot. The chatbot 118 provides a structured action to a query and/or command processor 120, which returns a response to the chatbot 118. Additionally, an end application 116 transmits a natural language action (for example, a query and/or a command) to the chatbot 118, which returns a response to the end application 116 based on the information obtained from the dialog state automata 114 and the query and/or command processor 120.

Figure 2:
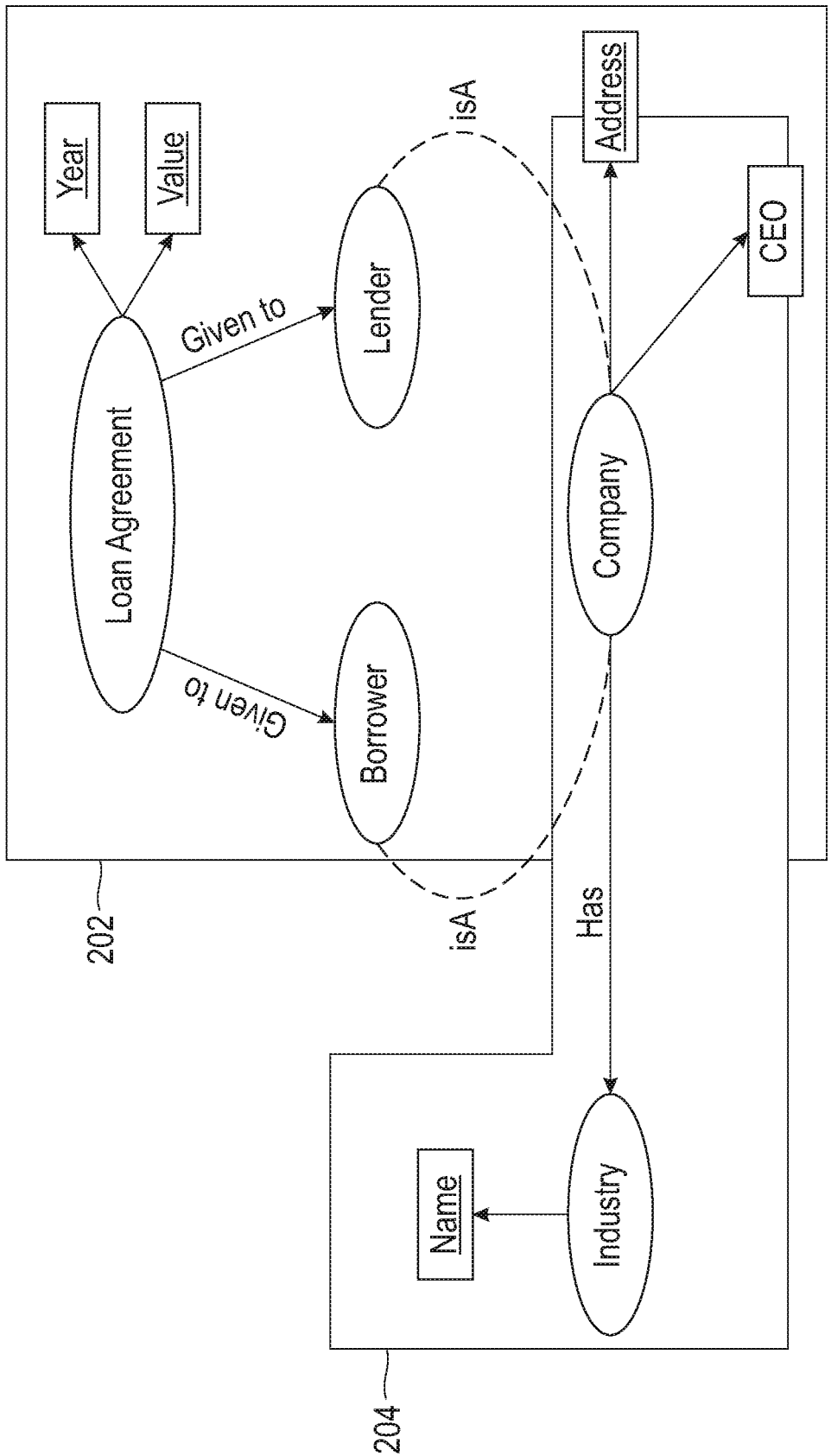
FIG. 2 is a diagram illustrating ontology partitioning, according to an exemplary embodiment of the invention.

FIG. 2 is a diagram illustrating ontology partitioning, according to an exemplary embodiment of the invention. By way of illustration, FIG. 2 depicts partitioning an ontology into a first portion 202 and a second portion 204. As detailed herein, given an ontology, the number of interpretation graphs can be combinatorically large. Accordingly, one or more embodiments of the invention can include enumerating states only within a partition, with no new states across partitions (only transition edges). Such an embodiment can include reducing the state space to a manageable finite set.

FIG. 3 is a diagram illustrating creating query classes, according to an exemplary embodiment of the invention. By way of illustration, FIG. 3 depicts a collection of queries 302, wherein the queries are described in structure query language-(SQL-)like language which can specify a structured query. As illustrated in FIG. 3, C1 . . . C2 . . . =concepts, while C1_P1 =any property P1 of C1. Additionally, C1_INTAGGR_P1 is the property P1 of C1 for which the integer is aggregable, while PATH_C1_C2=a path between C1 and C2 in the ontology. Also, C1_INT_P1_VAL is the value of C1_INT_P1. Further, in one or more embodiments of the invention, such query classes can be manually specified.

Figure 4:
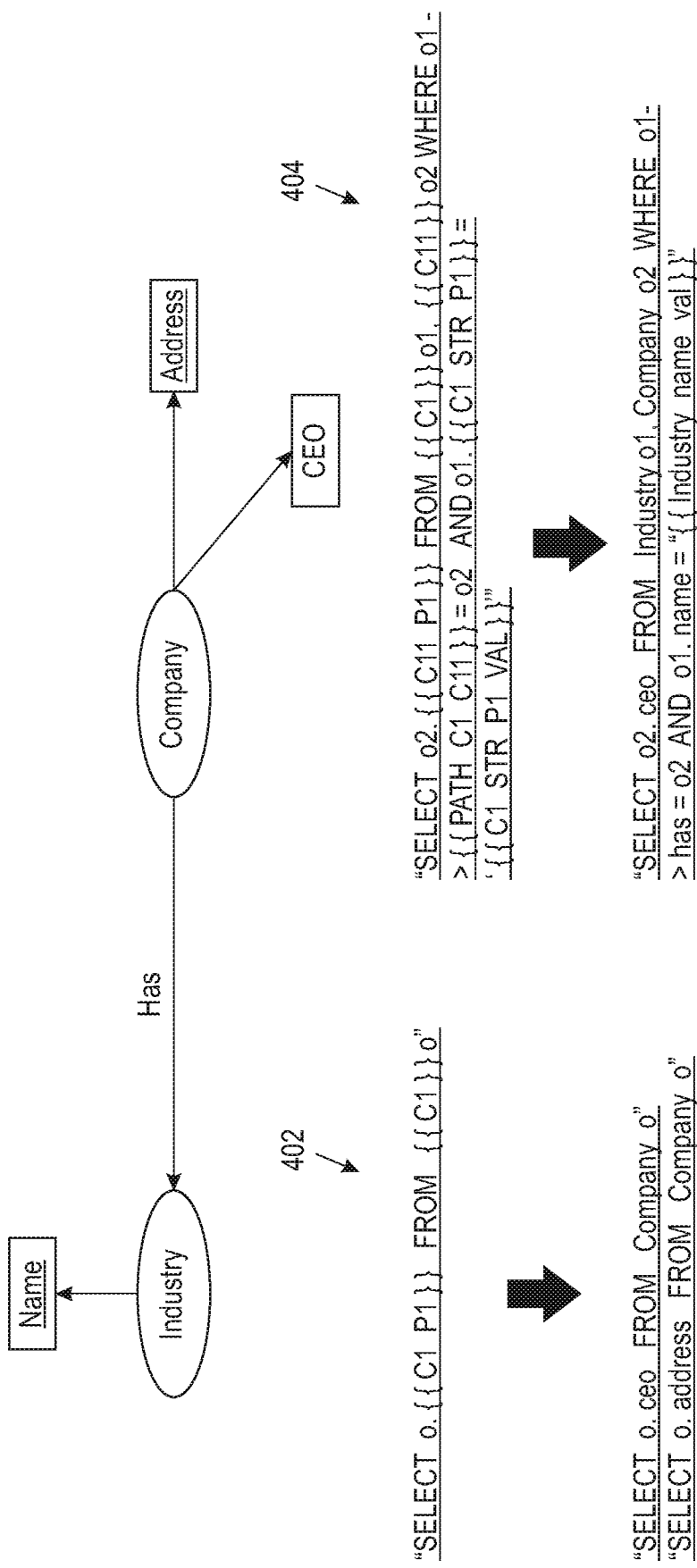
FIG. 4 is a diagram illustrating creating an ontology-dependent parameterized query, according to an exemplary embodiment of the invention.

FIG. 4 is a diagram illustrating creating ontology-dependent parameterized queries 402 and 404, according to an exemplary embodiment of the invention. At least one embodiment of the invention, such as depicted in FIG. 4, includes creating entities. Such created entities can include value entities and/or schema element entities. With respect to value entities, one or more embodiments can include finding properties in the ontology that are possible to refer to in a query (such as, for example, company name, chief executive officer (CEO) name, etc.). Such an embodiment can then include obtaining the values of the property and creating entities for each value. With respect to schema element entities, for all concepts and for their properties in the ontology, one or more embodiments of the invention can include creating entities which contain the synonyms for those entities.

Figure 5:
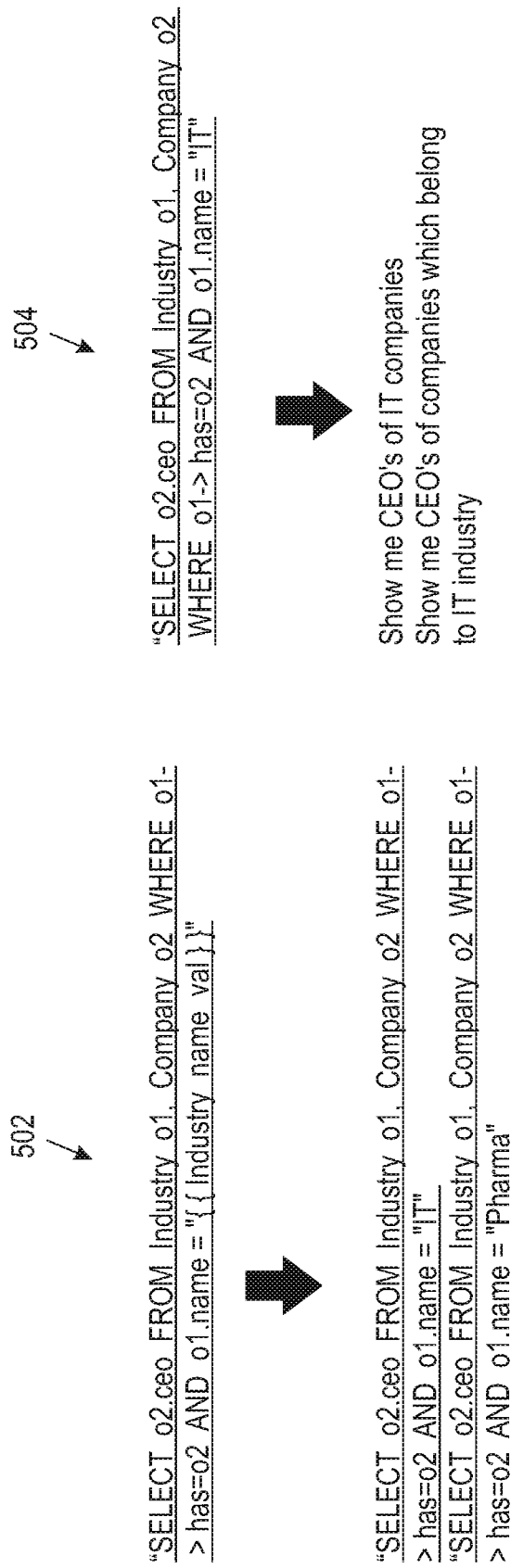
FIG. 5 is a diagram illustrating creating an intention, according to an exemplary embodiment of the invention.

FIG. 5 is a diagram illustrating creating an intention, according to an exemplary embodiment of the invention. By way of illustration, FIG. 5 depicts step 502, which includes generating a concrete action (using values from entities) from a parameterized action. Step 502 can also include instantiating with one or more values, such that an intent classifier can classify the action accurately. 504 includes generating one or more natural language queries corresponding to each concrete action, wherein the NL queries become the intention examples. Step 504 can be carried out, for example, using parsing queries and replacing different components of the queries with natural language phases.

Figure 6:
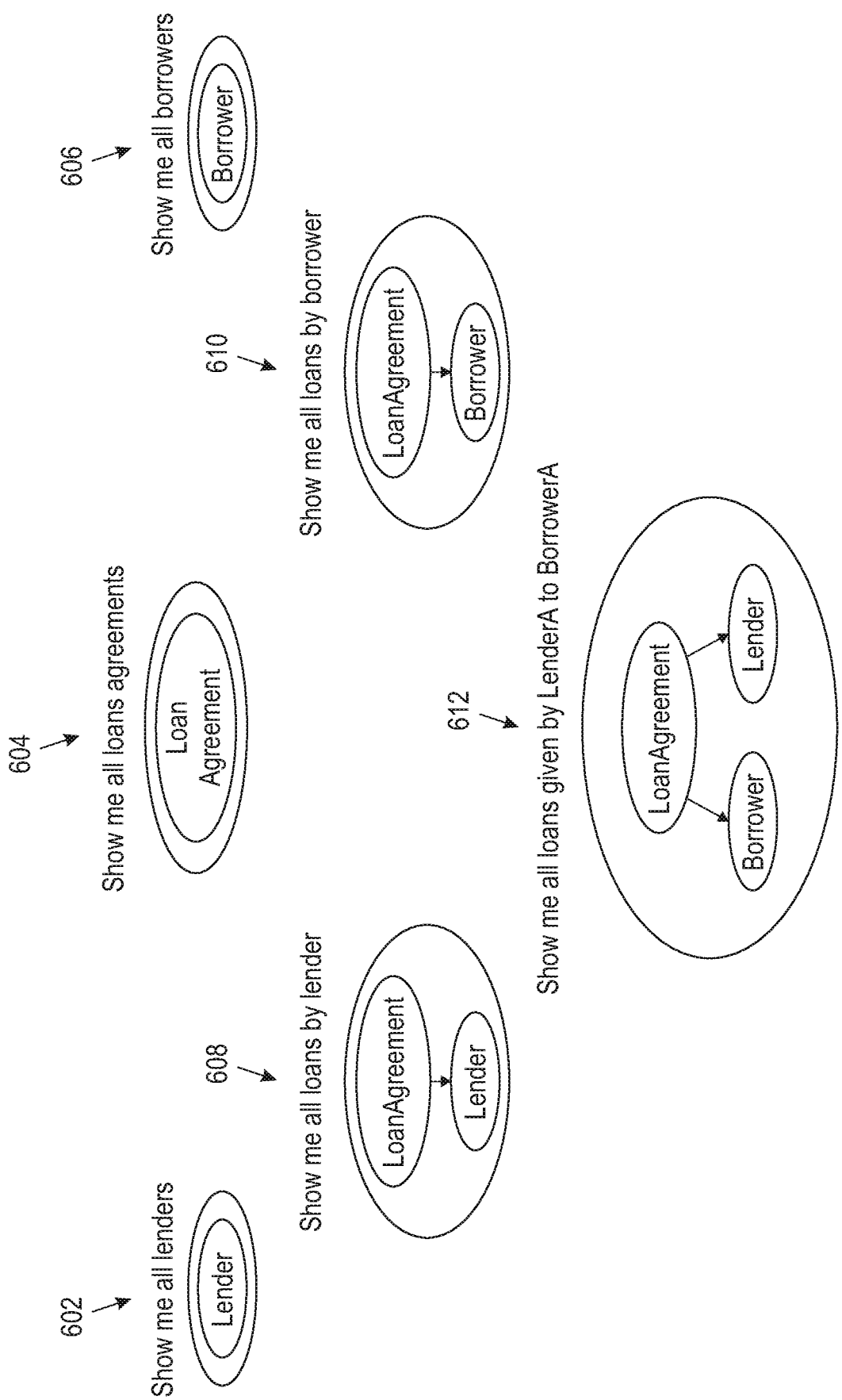
FIG. 6 is a diagram illustrating dialog states, according to an exemplary embodiment of the invention.

FIG. 6 is a diagram illustrating dialog states, according to an exemplary embodiment of the invention. By way of illustration, FIG. 6 depicts a "show me all lenders" dialog state 602, a "show me all loans agreements" dialog state 604, a "show me all borrowers" dialog state 606, a "show me all loans by lender" dialog state 608, a "show me all loans by borrower" dialog state 610, and a "show me loans given by LenderA to BorrowerA" dialog state 612. Additionally, in one or more embodiments of the invention, the response of each dialog state is the parameterized ontology dependent query. Also, inside each dialog state, the ontology concepts from which the state is created can be presented and/or included.

Figure 7:
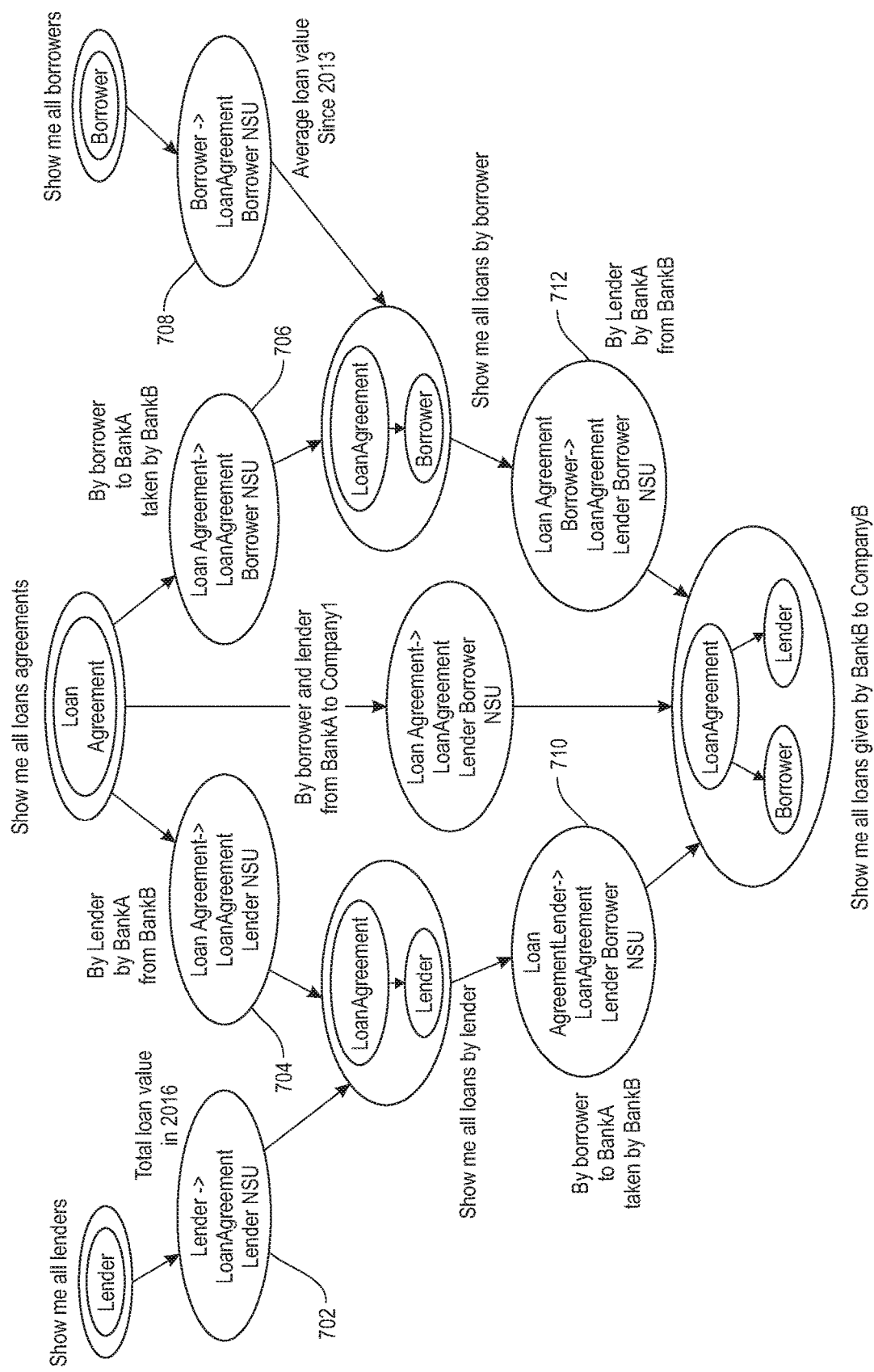
FIG. 7 is a diagram illustrating transition states, according to an exemplary embodiment of the invention.

FIG. 7 is a diagram illustrating transition states, according to an exemplary embodiment of the invention. By way of illustration, FIG. 7 depicts example transition states 702, 704, 706, 708, 710 and 712. In connection with the example embodiment depicted in FIG. 7, consider the following run-time flow. A user submits a query, and that query is then matched to one of the dialog states by matching the query to the closest intention. Additionally, the relevant query parameter will be automatically filled-up and/or generated. For example, assume that a user has asked "Show me CEO's of Airline companies." Also, assume that "Airline" exists in the entity industry.name. As such, the dialog system can map this query into a dialog state having an intention example of "Show me CEOs of IT companies." Such a system embodiment can also find the response by proper parameterization. Such a query can subsequently be taken by a command processor and executed, and the corresponding response can be generated and shown to the user.

Figure 8:
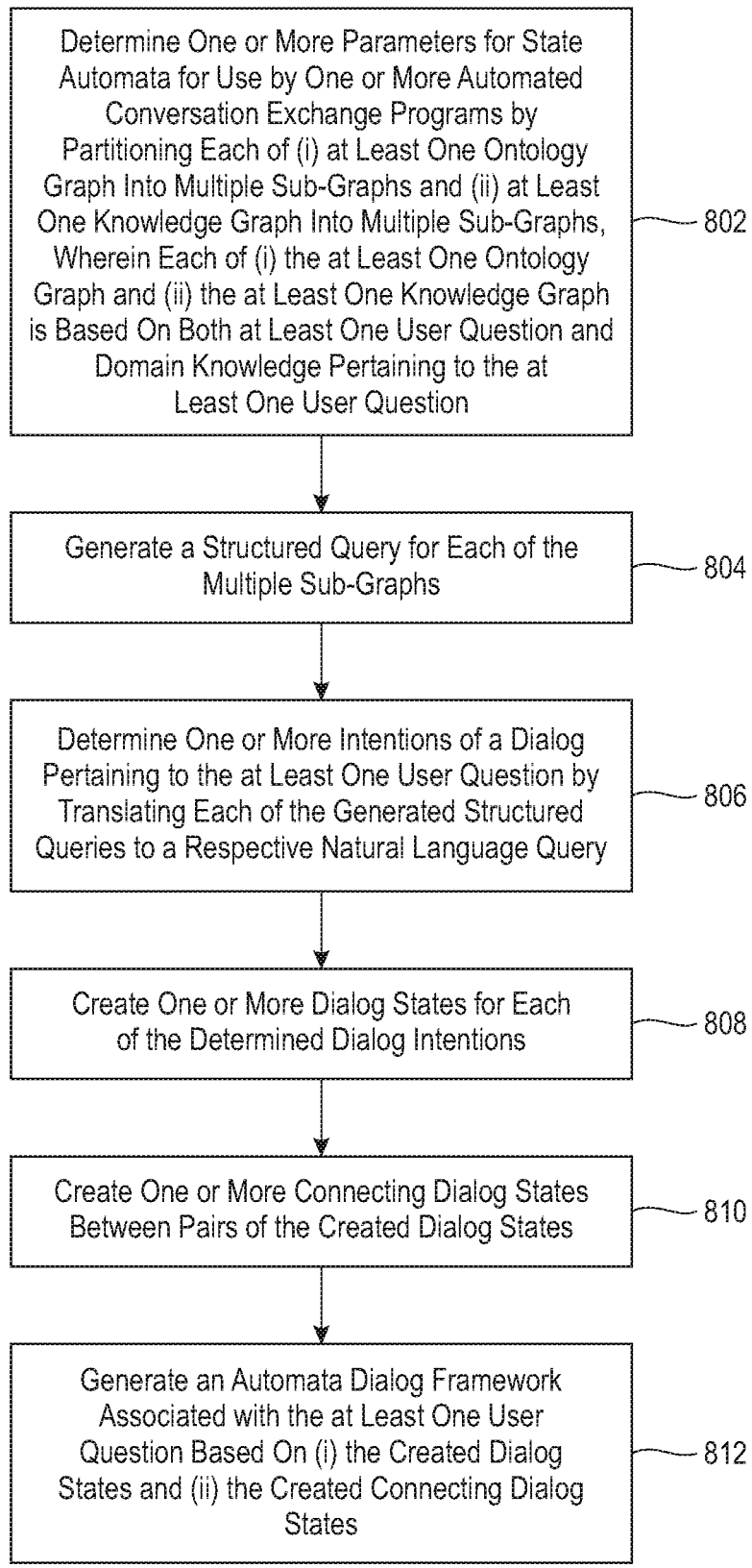
FIG. 8 is a flow diagram illustrating techniques according to an embodiment of the invention.

FIG. 8 is a flow diagram illustrating techniques according to an embodiment of the present invention. Step 802 includes determining one or more parameters for state automata for use by one or more automated conversation exchange programs by partitioning each of (i) at least one ontology graph into multiple sub-graphs and (ii) at least one knowledge graph into multiple sub-graphs, wherein each of (i) the at least one ontology graph and (ii) the at least one knowledge graph is based on both at least one user question and domain knowledge pertaining to the at least one user question, and wherein each state in the state automata represents a structured action comprising at least one of a query and a command.

Determining the one or more parameters can include creating one or more ontology-independent structured action classes, as well as creating one or more ontology-dependent parameterized actions based on the one or more ontology-independent structured action classes. Also, one or more embodiments of the invention can include generating, for each of the ontology-dependent parameterized actions, an action intention, as well as generating one or more concrete actions based on the one or more ontology-dependent parameterized actions. Further, at least one embodiment of the invention can include deriving an identification of one or more entities, and generating one or more concrete actions, using values from the one or more entities, based on the one or more ontology-dependent parameterized actions. One or more embodiments of the invention can also include generating one or more natural language queries corresponding to each of the concrete actions.

Step 804 includes generating a structured query for each of the multiple sub-graphs. Step 806 includes determining one or more intentions of a dialog pertaining to the at least one user question by translating each of the generated structured queries to a respective natural language query.

Step 808 includes creating one or more dialog states for each of the determined dialog intentions. Creating one or more dialog states can include creating one or more action dialog states for each generated action intention, and representing a difference between two of the action dialog states using one or more natural language actions.

Step 810 includes creating one or more connecting dialog states between pairs of the created dialog states. Step 812 includes generating an automata dialog framework associated with the at least one user question based on (i) the created dialog states and (ii) the created connecting dialog states. Additionally, one or more embodiments of the invention can include creating a non-sequential utterance intention pertaining to the difference, creating a transition dialog state associated with the two action dialog states, creating a dialog flow comprising the two action dialog states and the transition dialog state, and assigning the created non-sequential utterance intention to the transition dialog state.

Also, an additional embodiment of the invention includes identifying, based on an analysis of an ontology graph and a knowledge graph pertaining to a particular end application, multiple states for a state automata dialog framework as valid interpretation graphs over the ontology graph, wherein each of the multiple states represents a structured action. Such an embodiment can also include determining one or more transition rules between related ones of the identified states, wherein each of the transition rules captures how the state automata dialog framework evolves from a first state to a second state. Further, such an embodiment can include assigning natural language passages to the one or more transition rules, and designing the state automata dialog framework for the particular end application based on (i) the multiple states, (ii) the one or more transition rules, and (iii) the assigned natural language passages. Such an embodiment can additionally include enabling one or more automated conversation exchange programs (also referred to herein as chatbots) to carry out one or more actions by translating one or more of the natural language passages into one or more structured actions.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
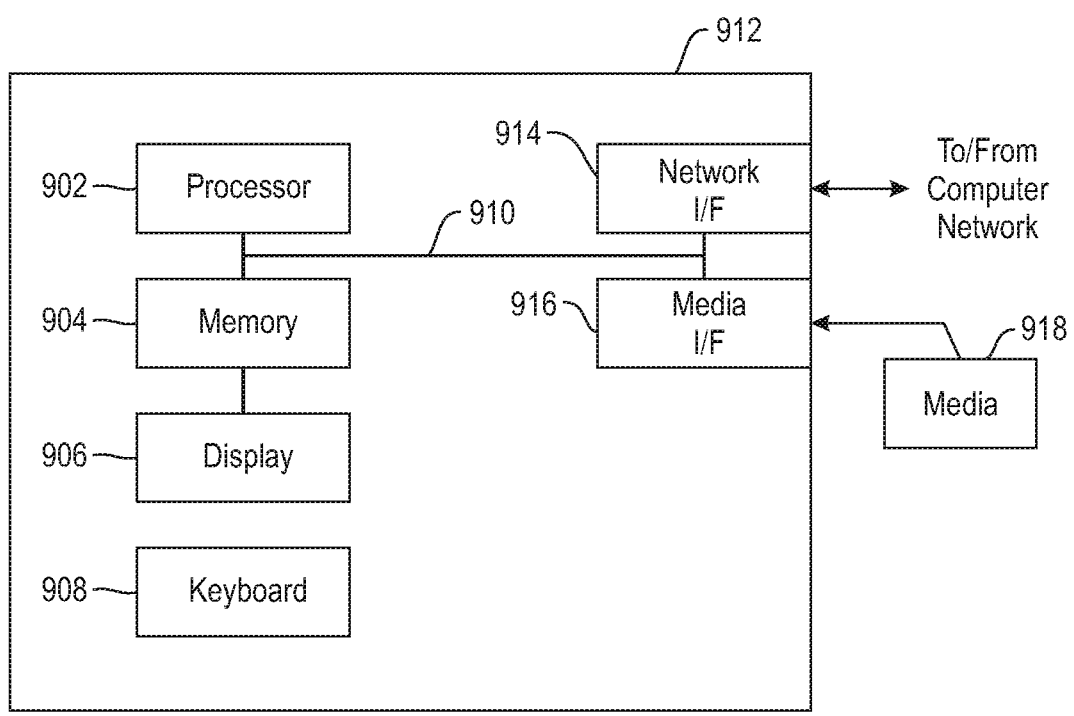
FIG. 9 is a system diagram of an exemplary computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
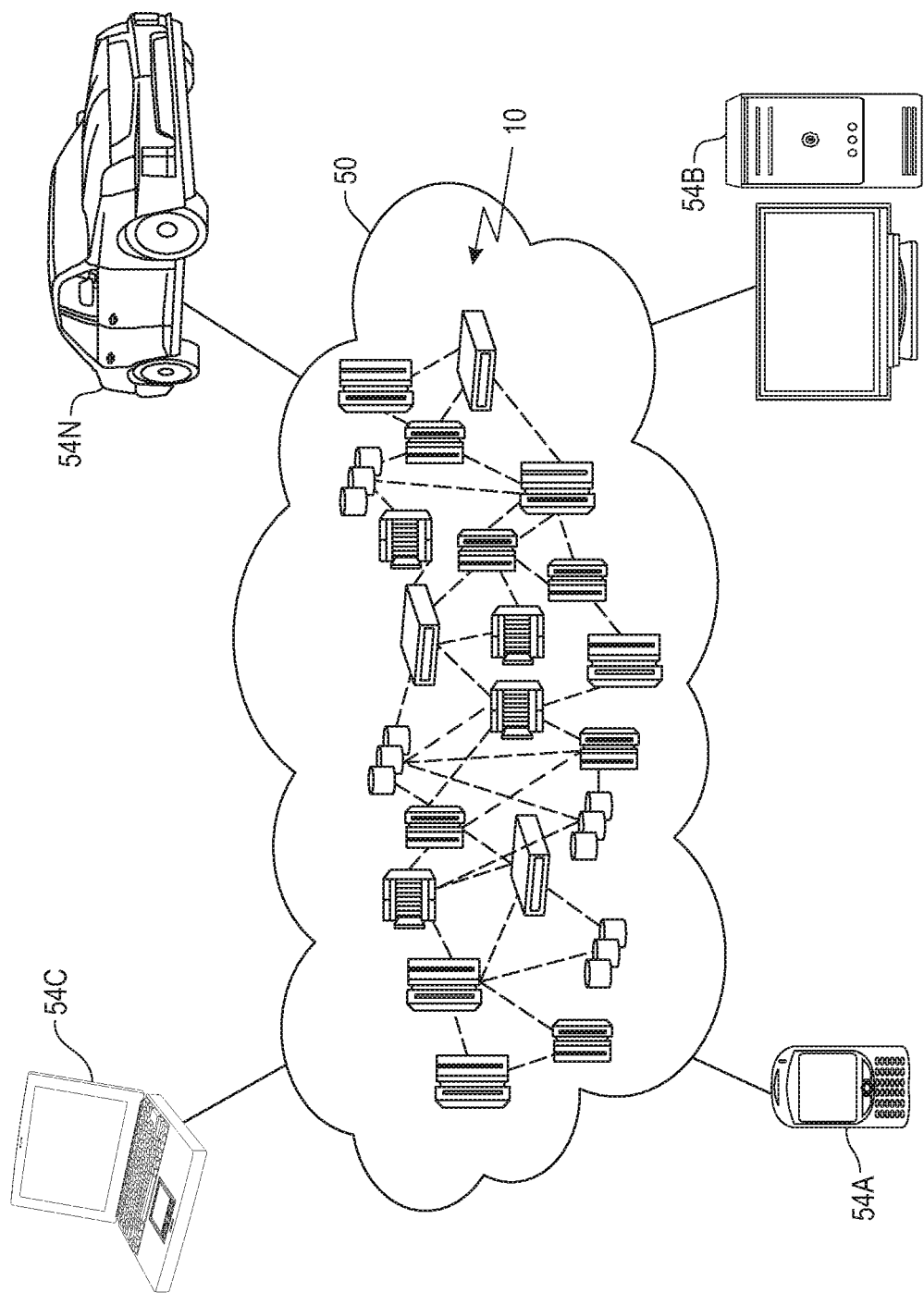
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
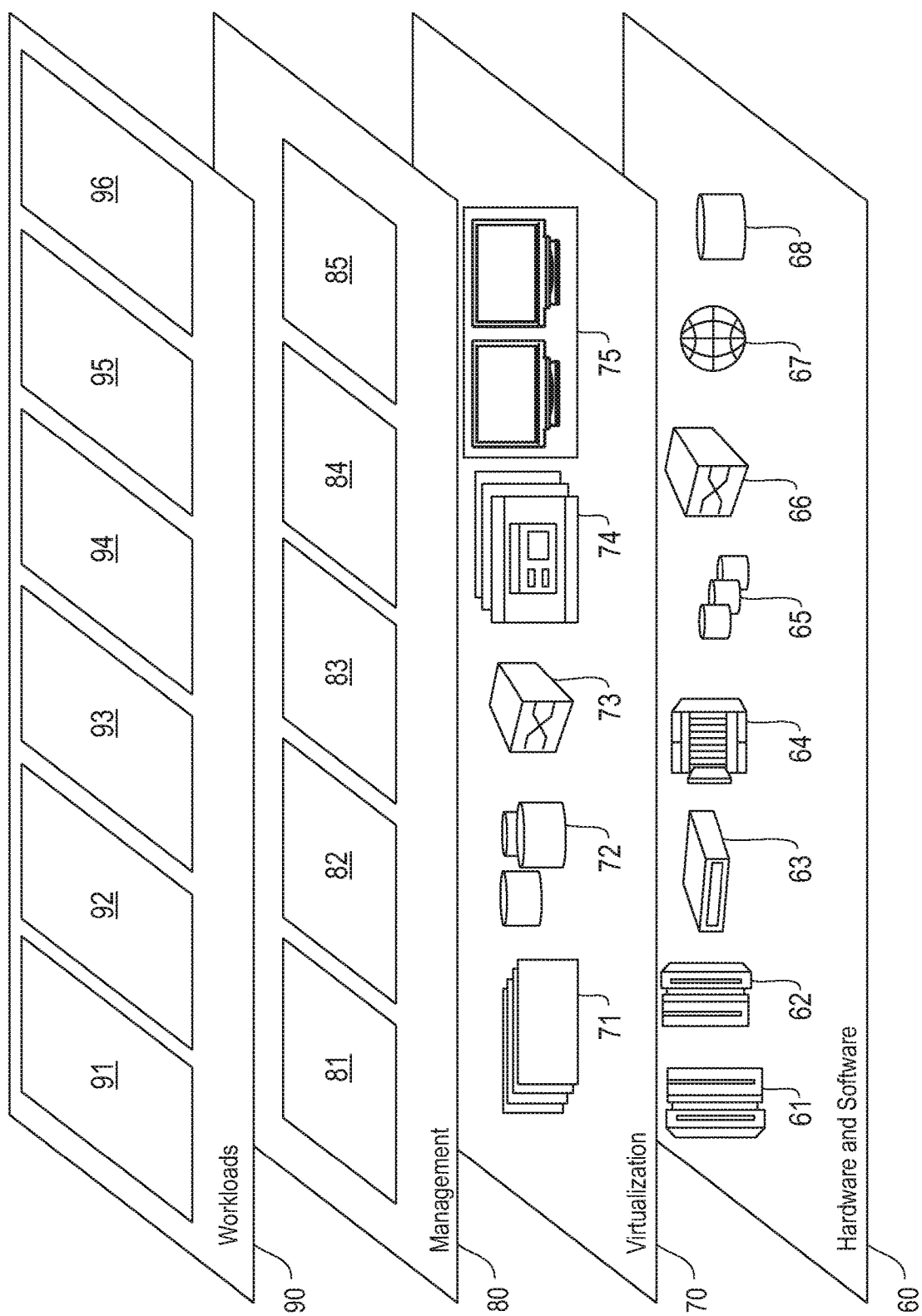
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ontology-based automatic bootstrapping 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically filling state automata parameter slots to instantiate a dialog framework for an end-application based on an ontology of domain knowledge.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
   determining one or more parameters for state automata for use by one or more automated conversation exchange programs by partitioning each of (i) at least one ontology graph into multiple sub-graphs and (ii) at least one knowledge graph into multiple sub-graphs, wherein each of (i) the at least one ontology graph and (ii) the at least one knowledge graph is based on both at least one user question and domain knowledge pertaining to the at least one user question, and wherein each state in the state automata represents a structured action comprising at least one of a query and a command;
   generating a structured query for each of the multiple sub-graphs;
   determining one or more intentions of a dialog pertaining to the at least one user question by translating each of the generated structured queries to a respective natural language query;
   creating one or more dialog states for each of the determined dialog intentions;
   creating one or more connecting dialog states between pairs of the created dialog states; and
   generating an automata dialog framework associated with the at least one user question based on (i) the created dialog states and (ii) the created connecting dialog states;
   wherein the steps are carried out by at least one computing device.

2. The computer-implemented method of claim 1, wherein said determining one or more parameters for state automata comprises creating one or more ontology-independent structured action classes.

3. The computer-implemented method of claim 2, wherein said determining one or more parameters for state automata comprises creating one or more ontology-dependent parameterized actions based on the one or more ontology-independent structured action classes.

4. The computer-implemented method of claim 3, wherein said determining one or more parameters for state automata comprises generating, for each of the ontology-dependent parameterized actions, an action intention.

5. The computer-implemented method of claim 3, wherein said determining one or more parameters for state automata comprises generating one or more concrete actions based on the one or more ontology-dependent parameterized actions.

6. The computer-implemented method of claim 3, wherein said determining one or more parameters for state automata comprises deriving an identification of one or more entities.

7. The computer-implemented method of claim 6, wherein said determining one or more parameters for state automata comprises generating one or more concrete actions, using values from the one or more entities, based on the one or more ontology-dependent parameterized actions.

8. The computer-implemented method of claim 5, wherein said determining one or more parameters for state automata comprises generating one or more natural language queries corresponding to each of the concrete actions.

9. The computer-implemented method of claim 4, wherein said creating one or more dialog states comprises creating one or more action dialog states for each of the generated action intentions.

10. The computer-implemented method of claim 9, wherein said creating one or more dialog states comprises representing a difference between two of the action dialog states using one or more natural language actions.

11. The computer-implemented method of claim 10, comprising:
creating a non-sequential utterance intention pertaining to the difference.

12. The computer-implemented method of claim 11, wherein said creating one or more dialog states comprises creating a transition dialog state associated with the two action dialog states.

13. The computer-implemented method of claim 12, wherein said generating an automata dialog framework comprises creating a dialog flow comprising the two action dialog states and the transition dialog state.

14. The computer-implemented method of claim 12, wherein said generating an automata dialog framework comprises assigning the created non-sequential utterance intention to the transition dialog state.

15. A computer program product comprising a computer readable storage medium having program instructions embodied therewith, the program instructions executable by a computing device to cause the computing device to:
determine one or more parameters for state automata for use by one or more automated conversation exchange programs by partitioning each of (i) at least one ontology graph into multiple sub-graphs and (ii) at least one knowledge graph into multiple sub-graphs, wherein each of (i) the at least one ontology graph and (ii) the at least one knowledge graph is based on both at least one user question and domain knowledge pertaining to the at least one user question, and wherein each state in the state automata represents a structured action comprising at least one of a query and a command;
generate a structured query for each of the multiple sub-graphs;
determine one or more intentions of a dialog pertaining to the at least one user question by translating each of the generated structured queries to a respective natural language query;
create one or more dialog states for each of the determined dialog intentions;
create one or more connecting dialog states between pairs of the created dialog states; and
generate an automata dialog framework associated with the at least one user question based on (i) the created dialog states and (ii) the created connecting dialog states.

16. The computer program product of claim 15, wherein said determining one or more parameters for state automata comprises creating one or more ontology-independent structured action classes.

17. The computer program product of claim 16, wherein said determining one or more parameters for state automata comprises creating one or more ontology-dependent parameterized actions based on the one or more ontology-independent structured action classes.

18. A system comprising:
a memory; and
at least one processor operably coupled to the memory and configured for:
determining one or more parameters for state automata for use by one or more automated conversation exchange programs by partitioning each of (i) at least one ontology graph into multiple sub-graphs and (ii) at least one knowledge graph into multiple sub-graphs, wherein each of (i) the at least one ontology graph and (ii) the at least one knowledge graph is based on both at least one user question and domain knowledge pertaining to the at least one user question, and wherein each state in the state automata represents a structured action comprising at least one of a query and a command;
generating a structured query for each of the multiple sub-graphs;
determining one or more intentions of a dialog pertaining to the at least one user question by translating each of the generated structured queries to a respective natural language query;
creating one or more dialog states for each of the determined dialog intentions;
creating one or more connecting dialog states between pairs of the created dialog states; and
generating an automata dialog framework associated with the at least one user question based on (i) the created dialog states and (ii) the created connecting dialog states.

* * * * *